Patented Dec. 13, 1932

1,890,596

UNITED STATES PATENT OFFICE

GEORGE ZOGRAPHOS, OF RIETH, OREGON

REMEDY FOR HEMORRHOIDS

No Drawing.    Application filed May 7, 1930.   Serial No. 450,594.

This invention relates to a remedy for hemorrhoids and has particular relation to a salve or ointment which is applied locally to the affected parts.

A salve or ointment which is useful in the treatment of piles or hemorrhoids must have many different qualities due to the conditions under which the remedy must operate.

The chafing of the clothing or of the body parts make it difficult to keep the remedy in its place while the secretions further render more difficult the problem of keeping the remedy in place.

The primary object of my invention is the provision of an improved remedy for piles or hemorrhoids.

Another object of the invention is the provision of an improved remedy for piles or hemorrhoids which will remain in place, absorb the moisture secreted and at the same time heal the parts by antiseptic and astringent action.

Other objects of the invention will be apparent to those skilled in the art from a reading of the complete specification.

The remedy consists of an ointment to be applied directly to the parts affected and comprises the following ingredients in substantially the proportions stated, viz: mutton tallow, 16 ounces; pure glycerine, 2 ounces; powdered calomel, 2½ ounces; green tansy weed, 1 ounce. Each of these elements, which together coact to form the efficient remedy which I have invented, performs its part in the combination and coacts to assist the other parts to perform theirs in a more efficient manner.

The mutton tallow forms the vehicle or carrier for the other ingredients and because of its relatively high melting point, keeps the ointment in its place.

The tansy weed carries a volatile oil which stimulates the smooth muscles adjacent the rectum and causes shrinkage of the cell tissues, causing the walls of the hemorrhoids to contract.

The glycerine also acts as an astringent causing cell shrinkage and at the same time removes the water secretions causing healing and at the same time giving assistance in the healing by preventing the separation of the ointment from the parts affected by the absorption of the small drops of water as secreted at the surface of the affected parts.

The glycerine acts further to protect the parts from irritation which might otherwise be caused by friction and assists in softening any undesirable matter which may have lodged on or be passing the affected parts.

The calomel acts as an antiseptic and in this way and by removing unhealthy tissue promotes healing, being assisted by the other ingredients to remain in contact with the tissues affected and to thereby perform its function more efficiently.

In the preparation of this ointment, instead of steeping the tansy in water, mutton tallow is used, the two being heated together. The volatile oils of the tansy weed, thereby goes directly into the tallow and is diffused therethrough. By preparing this tansy weed in this manner, no water is added to destroy or impair the effectiveness of the tallow or glycerine in their absorption function. After the tansy and tallow are combined, the calomel and glycerine are added and thoroughly mixed.

While, so far as is known, the ingredients which go to make up my ointment undergo no chemical change because of the placing them together, as pointed out above, they act together to promote each others function.

While I have described and claimed an embodiment of my invention in detail, it is understood that the disclosure is merely illustrative and that modifications and changes may be made by substituting equivalent ingredients and that variations may be made in proportions without departing from the spirit of the invention.

This application is a continuation in part of my application Number 237,586, filed December 3, 1927.

Having described my invention what I claim and desire to secure by Letters Patent is:—

The process of preparing an ointment for hemorrhoids which consists in first heating tansy and mutton tallow together, thoroughly mixing while hot, then adding calomel and glycerine and thoroughly mixing the whole.

In testimony whereof I hereunto affix my signature.

GEORGE ZOGRAPHOS.